United States Patent Office 3,373,170
Patented Mar. 12, 1968

3,373,170
AMINE SALTS OF BORIC ACID-POLYOL
COMPLEXES
Loyd W. Jones, Tulsa, Okla., assignor to Pan American Petroleum Corporation, Tulsa, Okla., a corporation of Delaware
No Drawing. Filed Sept. 17, 1964, Ser. No. 397,289
7 Claims. (Cl. 260—345.8)

ABSTRACT OF THE DISCLOSURE

A group of compounds are proposed for inhibiting corrosion and controlling microbiological growth which can be generically described as amine salts of boric acid-polyol complexes, or as amine borates in polyol solutions.

The present invention relates to new and useful compositions of matter. More particularly, it is concerned with novel compositions useful both as biocides and as corrosion inhibitors. These compositions, generally designated as amine salts of boric acid-polyol complexes, have the following general structural formula:

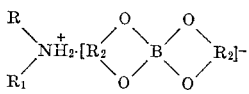

wherein R may be $$CH_3(CH_2)_{11}NH(CH_2)_3—, NH_2CH_2CH_2—$$

and an aliphatic hydrocarbon radical having not more than 12 carbon atoms; $R_1$ is hydrogen and R and $R_1$ combined may represent phenyl or a cyclohexyl group; and $R_2$ is a member of the group consisting of —$CH_2CHZ$— where Z may be hydrogen or an alkyl group of not more than 2 carbon atoms;

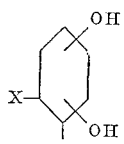

where X is hydrogen, methyl or hydroxyl; the aliphatic polyol radical —$CH_2CH(CHOH)_yCH_2OH$, where y is an integer less than 4; and

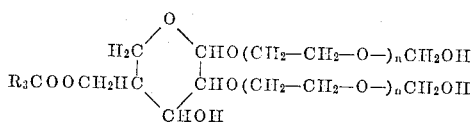

wherein n represents an integer from 2 to 12 and $R_3$ is an alkyl group having from about 11 to 17 carbon atoms.

As examples of complexes included within the above generic formula, there may be mentioned the following:

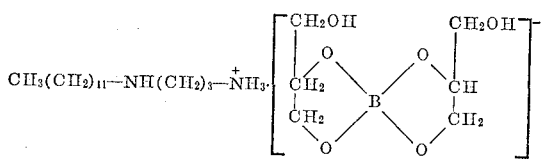

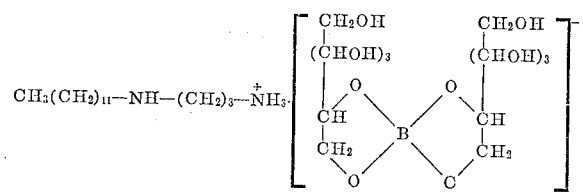

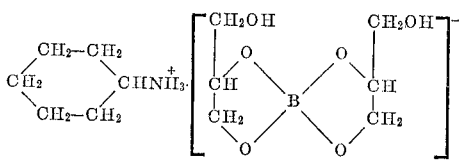

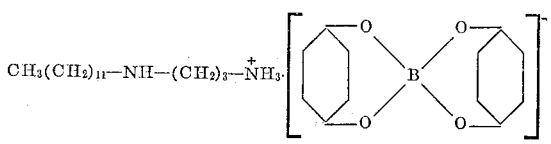

While a number of materials are now available as corrosion inhibitors in aqueous systems, such compositions have little or no effect on bacteria, particularly the type encountered in waterflooding employed in secondary oil recovery operations. Also, in the case of cooling systems, *separate* corrosion inhibitors and bactericides have to be added to minimize, respectively, corrosion of metal parts and to suppress bacterial growth in the piping and cooling tower. One of the principal features of novelty in the compositions of my invention resides in the fact that they function both as corrosion inhibitors and biocides. Moreover, while it is generally the case that known corrosion inhibitors inhibit oxygen or hydrogen sulfide corrosion, but not both, the compositions of my invention are capable of inhibiting oxygen corrosion as well as that caused by hydrogen sulfide.

Orthoboric acid used in preparing these complexes is a weak acid ($K=5.8 \times 10^{-10}$) which does not react completely with bases below a pH of 8.5. However, it complexes with polyhydric alcohols to form a product of pronounced acidity. In this complex boric acid acts as a strong monobasic acid capable of reacting completely with alkalies. As a comparison of strength, it should be pointed out that one gram of boric acid dissolved in 100 ml. of water requires only 1.5 ml. of N/l. sodium hydroxide for neutralization to the phenolphthalein end point (pH 8.3). The same amount of boric acid in a 50:50 glycerine-water solution requires 16:1 ml. N/l. sodium hydroxide. In water boric acid is soluble to the extent of only about 5.0 weight percent. In glycerine its solubility is increased to 20 weight percent. Accordingly, it is seen that by combining or complexing boric acid with a polyhydric alcohol, the properties of the acid can be changed radically.

I have now discovered that substantially water-insoluble amines react stoichiometrically with orthoboric acid-polyol complexes. The resulting products, which are generally viscous, straw-colored liquids, range in solubility from water-soluble to oil-soluble, depending upon the particular polyols used. Solubility can also be varied by combining water-soluble amines with oil-soluble boric acid-polyol complexes; such as, for example, complexes formed from boric acid and glyceryl monolaurate, monooleate, etc. Where diamines are used, the molar ratio of amine to boric acid is generally 1:2. With the monoamines the ratio is preferably 1:1. In making these compositions, water is formed and may or may not be driven off, depending on whether or not the product is to be used in an aqueous system.

The amine salt formation is indicated to occur in a mol to mol ratio. However, this may vary since some of the boric acid-polyol complexes can solubilize the amine to a greater extent than might be predicted from the measured acidity of the boric acid-polyol complex. I have found that in preparing the complexes of my invention from water-soluble glycols, glycerine, sorbitol, etc., the final product is water-soluble even though the amine used may be water-insoluble. The degree of stability of the complex in water and its water-solubility varies somewhat with the different polyols. Instability in water solutions results in some cases from hydrolysis of the complex and the release of free boric acid. Use of about 5 percent less amine than the theoretical enhances water solubility of the final product. Stability of the latter in water solutions is improved where glycerine is used as the polyhydric alcohol by addition of about 8 to 10 weight percent sorbitol, based on the glycerine.

The method by which the complexes of my invention are prepared is simple. The amine—if water-insoluble—is dissolved in an alcohol, e.g., isopropyl alcohol. The polyhydric alcohol and boric acid are mixed and then combined with the amine solution. The reaction involved is exothermic and the temperature of the reaction mixture may go as high as about 200° F. In general, however, the reaction temperature ranges from about 150° to about 170° F. Theoretically, about 2 mols of polyol are needed for each mol of boric acid. However, improved results are generally obtained by providing an excess of polyol, i.e., 3 to 6 mols per mol of boric acid.

Amines that may be used in preparing the novel complexes of my invention are amines such as butylamine, ethylene diamine, aniline, octylamine, N-dodecyl trimethylene diamine, cyclohexyl amine, and the like. As examples of suitable polyols there may be mentioned glycerol, sorbitol, ethylene glycol, propylene glycol, polyhydric benzenes, such as resorcinol, pyrogallol, hydroquinone, orcinol, pyrocatechol, phloroglucinol, 1,3-butylene glycol, polyalkylene oxide adducts of polyhydric alcohols, such as, for example, polyoxyethylene sorbitan monopalmitates.

The water-soluble products of my invention are useful as biocides and as corrosion inhibitors, particularly corrosion caused by the presence of free dissolved oxygen or hydrogen sulfide. Also, water solutions of these complexes possess properties making them useful as flotation agents.

Specific formulations of the complexes of my invention useful as biocides and corrosion inhibitors are listed below:

TABLE I

*Complex No. 1*

| Compound: | Weight percent |
|---|---|
| N-dodecyl trimethylene diamine[1] | 20.3 |
| Glycerine | 43.7 |
| Isopropyl alcohol | 14.2 |
| Boric acid | 9.8 |
| Sorbitol | 7.2 |
| Water | 4.8 |

*Complex No. 2*

| | |
|---|---|
| Polyoxyethylene sorbitan monoplamitate[2] 1/20 mol 20.1% | 26.1 |
| Boric acid 1/4 mol 6.0% | |
| Cyclohexylamine | 5.0 |
| Glycerine | 8.0 |
| Water | 60.9 |

[1] Hereafter referred to as Duomeen C.
[2] Prepared by reacting 1 mol of sorbitan monopalmitate with 20 mols of ethylene oxide referred to elsewhere herein as "Tween 40."

*Complex No. 3*

This is the same as Complex No. 2 except ethylene diamine is employed in an amount corresponding to 3 weight percent and substituted for cyclohexyl amine.

Other complexes having the compositions indicated below also were prepared:

| Compound | Complex No. (weight percent) | | | | | | | | | | | | |
|---|---|---|---|---|---|---|---|---|---|---|---|---|---|
| | 4 | 5 | 6 | 7 | 8 | 9 | 10 | 11 | 12 | 13 | 14 | 15 | 16 |
| Duomeen C | 21.6 | 17.2 | 17.2 | 20.6 | 18.1 | 18.1 | 18.2 | 18.2 | 18.2 | 18.2 | 21.5 | 18.5 | 17.0 |
| Boric Acid | 9.4 | 7.8 | 7.8 | 9.4 | 8.2 | 8.2 | 8.2 | 8.2 | 8.2 | 8.2 | 10.4 | 8.9 | 8.0 |
| Isopropyl Alcohol * | 15.0 | 15.0 | 15.0 | 15.0 | 15.7 | 15.7 | 15.8 | 15.8 | 15.8 | 15.8 | ---- | 12.9 | 15.0 |
| Glycerine | 35.0 | 35.0 | 35.0 | 41.2 | 38.2 | 38.2 | 40.0 | 40.0 | 40.0 | 40.0 | 46.5 | 39.7 | 35.0 |
| Tween 40 | 8.3 | 8.3 | 8.3 | 2.2 | 2.2 | 2.2 | 0 | 0 | 0 | 0 | 7.6 | 0 | 1.0 |
| Sorbitol | 0 | 0 | 0 | 0 | 0 | 0 | 0 | 0 | 0 | 0 | 0 | 6.5 | 5.0 |
| Water | 10.7 | 10.7 | 10.7 | 11.7 | 12.3 | 12.3 | 12.6 | 12.6 | 12.6 | 12.6 | 5.1 | 4.4 | 14.0 |
| Pyrocatechol | 0 | 5.0 | 0 | 0 | 5.3 | 0 | 0 | 0 | 0 | 0 | 9.1 | 0 | 0 |
| Hydroquinone | 0 | 0 | 5.0 | 0 | 0 | 5.3 | 0 | 5.2 | 0 | 0 | 0 | 0 | 5.0 |
| Salicylic Acid | 0 | 0 | 0 | 0 | 0 | 0 | 5.2 | 0 | 0 | 0 | 50.0 | 0 | 0 |
| Resorcinol | 0 | 0 | 0 | 0 | 0 | 0 | 0 | 0 | 0 | 5.2 | 0 | 9.1 | 0 |

* Useful to reduce viscosity of polyhydric alcohol.

Representative complexes taken from the above list were subjected to both oxygen corrosion and biocidal tests. The corrosion tests were carried out using mild steel coupons 1″ x 1″ x 1/16″ (weighing 4.0 to 4.5 grams) which were rotated in an aerated salt water solution containing 1 weight percent salts in the following proportions:

TABLE II

| Ions: | Weight percent |
|---|---|
| Sodium | 35.58 |
| Calcium | 3.73 |
| Magnesium | 1.18 |
| Potassium | 1.10 |
| $Cl^-$ | 55.04 |
| $SO_4^=$ | 7.69 |
| $HCO_3^-$ | 0.41 |

The test solution was saturated with oxygen at all times and was maintained at constant temperature (130°, ±2° F.) for 24 hours. Percent inhibition was calculated by use of the formula:

$$\frac{\text{(Weight Loss of Control Sample)} - \text{(Weight Loss of Inhibited Sample)}}{\text{Weight Loss of Control Sample}} \times 100$$

The following results were obtained:

TABLE III

| Inhibitor | P.p.m. Active | Percent Inhibition | Remarks |
|---|---|---|---|
| Quaternary ammonium chloride—commercial biocide. | 1,000 | 9.9 | All of coupon surface attacked. |
| Commercial rust inhibitor | *2,000 | 43.2 | Most of coupon protected. Attack at coupon edges and holder. |
| Do | 1,000 | 45.0 | Most of coupon surface protected. Attack at coupon edges and holder. |
| $Na_2CrO_4$ | 500 | 80.9 | |
| Sodium zinc phosphate | 500 | 82.9 | |
| Complex No. 1 | 1,000 | 25.4 | Most of coupon surface protected. Attack at coupon edges and holder. |
| Complex No. 2 | 1,000 | 13.7 | 80% of coupon protected. Attack concentrated at holder. |
| Complex No. 4 | 500 | 31.6 | |
| Complex No. 5 | 500 | 22.9 | |
| Complex No. 6 | 500 | 40.7 | |
| Complex No. 7 | 500 | 39.9 | |
| Complex No. 8 | 500 | 35.1 | |
| Complex No. 9 | 527 | 52.8 | |
| Complex No. 10 | 527 | 57.7 | |
| Complex No. 11 | 527 | 11.7 | |
| Complex No. 12 | 527 | 41.2 | |
| Complex No. 13 | 527 | 34.7 | |
| Complex No. 14 | 200 | 23.7 | Attack around metal-holder contact. |
| Complex No. 15 | 1,000 | 73.6 | Mild attack at coupon holder only. Precipitate on metal surface. |
| Complex No. 16 | *2,000 | 60.3 | |
| Complex No. 16 | *1,000 | 44.5 | |

*Concentration in these tests figured on "as is" basis without regard to active component concentrations.

From the above results it will be seen that a number of these complexes are comparable to commercial inhibitors in their ability to suppress corrosion. In the majority of cases the greater area of the test coupon was well protected. Generally, the principal corrosion that developed when said complexes were used, occurred at the point of contact of the plastic holder with the metal coupon.

To demonstrate the effectiveness of the compositions of my invention as inhibitors of hydrogen sulfide corrosion, a static bottle test was employed. This test is a standard laboratory procedure for evaluating the ability of a given material to prevent hydrogen sulfide corrosion. Mild steel test coupons were exposed five days to 5% NaCl air-free brine containing 666 p.p.m. hydrogen sulfide. The inhibitor was added to the sour brine at the indicated test concentration prior to immersion of the steel coupons. Identical tests without inhibitors served as controls. Weight loss of the inhibited coupons relative to the loss of the controls indicates the degree of effectiveness expressed as percent inhibition of corrosion.

TABLE IV

| Inhibitor | P.p.m. Active | Percent Inhibition | Weight Loss, mg./2 sq.in./24 hours, Average of Two | |
|---|---|---|---|---|
| | | | Control | With Inhibitor |
| Complex No. 16 | 25 | 94.5 | 38.4 | 2.1 |
| Do | 50 | 96.1 | 38.4 | 1.5 |
| A commercial amine salt inhibitor. | 25 | 96.8 | 38.4 | 1.2 |
| Do | 50 | 96.5 | 38.4 | 1.3 |

The above results clearly demonstrate that the compositions of my invention function very efficiently as hydrogen sulfide corrosion inhibitors.

A series of tests was also carried out to demonstrate the ability of this class of complexes to inhibit bacterial growth of the type such as is encountered in cooling towers and waterflooding operations. These tests were of two types: The flowing or dynamic test and the static or time-kill procedure. The flowing test, in essence, is modeled after a full-scale water injection system employed in flooding operations. Water containing salts and organic nutrients is circulated through glass pipe containing exposed steel surfaces. The water passes through once and is discarded. The whole system is inoculated with known strains of bacteria common to water-flood equipment. The piping is arranged in two identical sets of tubes each connected in series. The bactericide being tested is injected between the two sets. Thus, the pipes downstream of the point of injection are always under treatment while the upstream set serves as controls. Differences in the rate of bacterial growth in the treated and untreated sides of the system indicate the effectiveness of the material being tested. Standard laboratory tube and plate culturing techniques are used to count the numbers of free floating microorganisms in samples periodically removed from several points in the test apparatus. The counts generally rise and fall with variations in the level of microbial activity. The extent to which a chemical under test suppresses the bacterial count is a measure of effectiveness which is expressed as percent inhibition.

In the static test, water inoculated with an organism of the type which it is desired to control is exposed to various concentrations of the proposed biocide. At specific intervals portions are removed and placed on a suitable agar culture medium prepared, for example, from tryptone glucose extract agar. Plates of the agar medium are then incubated and observed for the appearance of bacterial colonies. The effectiveness of the biocides is established by determining the difference in the number of colonies on the treated and untreated plates.

EXAMPLE I

The first test to determine the ability of the composition of my invention to function as biocides was a flowing test in which the specific material under investigation was prepared from the following compounds:

| Compound: | Weight percent |
|---|---|
| Duomeen C | 24.00 |
| Boric acid | 10.95 |
| Isopropyl alcohol | 27.10 |
| Sorbitol | 26.60 |
| Water | 11.35 |

The above composition was added continuously to a stream inoculated with cultures of Pseudomonas sp. and Desulfovibrio, and the bactericidal properties of said composition determined in accordance with the flow test procedure described above. In all cases, the material being tested was employed in a concentration of 5 p.p.m. of amine borate. The results obtained are given below:

TABLE V

| Length of Test (Days) | Percent Growth Inhibition | |
|---|---|---|
| | Pseudomonas sp. | Desulfovibrio desulfuricans |
| 3 | 81 | 100 |
| 4 | 78 | 100 |
| 5 | 75 | 100 |
| 6 | 67 | 100 |

EXAMPLE II

In a series of static tests a number of known biocides were compared with a complex of the following compositions:

| Compound: | Weight percent |
|---|---|
| Duomeen C | 23.3 |
| Boric acid | 10.7 |
| Isopropyl alcohol | 18.0 |
| Glycerine | 48.0 |

For purposes of identification this complex is designated as Cimplex A in the table below. A suspension of aerobically growing organism (Pseudomonas sp.) was exposed to 5 p.p.m. of each biocide for one hour after which the surviving bacteria were counted by plating out on nutrient agar and counting the colonies after 48 hours incubation at 98° F.

TABLE VI

| Biocide: | Cells/ml. surviving |
|---|---|
| None (control) | $23.1 \times 10^5$ |
| Boric acid | $25.3 \times 10^5$ |
| Glycerine | $21.8 \times 10^5$ |
| Glycerine (2.5 p.p.m.)+boric acid (2.5 p.p.m.) | $25.6 \times 10^5$ |
| Commercially available biocide | $17.5 \times 10^4$ |
| Complex A | $21.0 \times 10^3$ |

EXAMPLE III

A second series of static tests was carried out under conditions identical to those recited in Example II, except that a different culture of mixed soil organisms was used in place of Pseudomonas sp. and Complex No. 1 of my invention was compared with a commercially available biocide to give the following results:

TABLE VII

| Biocide: | Cells/ml. surviving |
|---|---|
| None (control) | $86 \times 10^7$ |
| Commercially available biocide | $49 \times 10^7$ |
| Complex No. 1 | $4.3 \times 10^7$ |

From the foregoing examples it will be seen that the amine salts of boric acid-polyol complexes contemplated by my invention exhibit pronounced bacterial activity and in some cases are indicated to be superior to presently available biocides.

I claim:

1. A water-soluble amine salt of a boric acid-polyol complex having the structural formula:

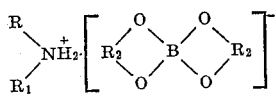

wherein the substituent R is selected from the group consisting of $CH_3(CH_2)_{11}NH(CH_2)_3$, $-NHCH_2CH_2$, and an aliphatic hydrocarbon radical having no more than 8 carbon atoms; $R_1$ is hydrogen and R and $R_1$ combined represent a member selected from phenyl and cyclohexyl groups; and the substituent $R_2$ is a member of the group consisting of $-CH_2CHZ-$, where Z is a member of the group consisting of hydrogen and an alkyl group of not more than 2 carbon atoms;

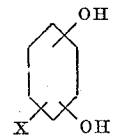

where X is a member selected from the group consisting of hydrogen, methyl, and hydroxyl; the aliphatic polyol radical $-CH_2CH(CHOH)_yCH_2OH$ where $y$ is an integer having less than 4; and

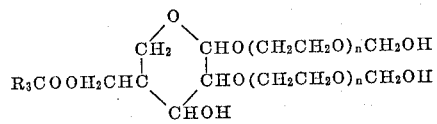

wherein $n$ represents an integer from 2 to 12 and $R_3$ is an alkyl group having from about 11 to 17 carbon atoms.

2. A water-soluble amine salt of a boric acid-polyol complex having the structural formula:

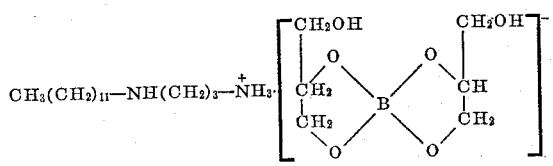

3. A water-soluble amine salt of a boric acid-polyol complex having the structural formula:

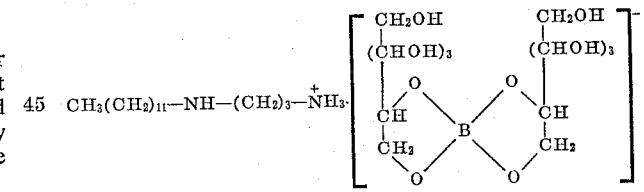

4. A water-soluble amine salt of a boric acid-polyol complex having the structural formula:

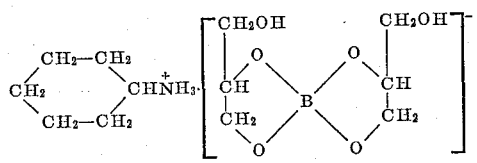

5. A water-soluble amine salt of a boric acid-polyol complex having the structural formula:

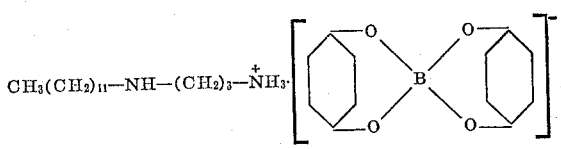

6. The complex of claim 2 to which from about 1 to 2 weight percent of a polyoxyethylene sorbitan mono palmitate has been added.

7. A water-soluble amine salt of a boric acid-polyol complex having the structural formula:
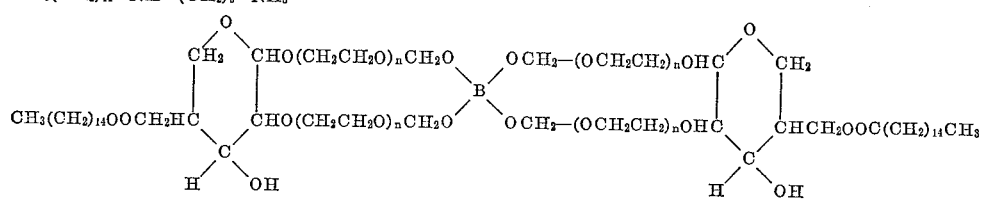
where $n$ is a number greater than two but less than thirteen.
References Cited
UNITED STATES PATENTS
| | | | |
|---|---|---|---|
| 1,975,890 | 10/1934 | Williams et al. | 260—462 |
| 3,267,126 | 8/1966 | Weil | 260—462 |
| 3,297,737 | 1/1967 | Weck | 260—462 |
JOHN D. RANDOLPH, *Primary Examiner.*
WALTER A. MODANCE, *Examiner.*
JOHN M. FORD, *Assistant Examiner.*